(12) United States Patent
Kiyokawa et al.

(10) Patent No.: US 9,738,276 B2
(45) Date of Patent: Aug. 22, 2017

(54) PARKING ASSIST SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Yusuke Kiyokawa, Nagoya (JP); Tomohisa Yamashita, Toyohashi (JP); Motonari Obayashi, Nagakute (JP); Hironobu Ishijima, Toyota (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/850,119

(22) Filed: Sep. 10, 2015

(65) Prior Publication Data

US 2016/0075326 A1    Mar. 17, 2016

(30) Foreign Application Priority Data

Sep. 12, 2014   (JP) ................. 2014-186826

(51) Int. Cl.
*B60W 30/06* (2006.01)
*B60K 35/00* (2006.01)
*B62D 15/02* (2006.01)

(52) U.S. Cl.
CPC .......... *B60W 30/06* (2013.01); *B60K 35/00* (2013.01); *B62D 15/0285* (2013.01); *B60W 2550/20* (2013.01)

(58) Field of Classification Search
CPC ... B60W 30/06; B60W 2550/20; B60K 35/00; B62D 15/0285

USPC .......................................................... 701/41
See application file for complete search history.

(56) References Cited

U.S. PATENT DOCUMENTS

| 2011/0093168 | A1  | 4/2011 | Barth et al. |
| 2014/0313059 | A1* | 10/2014 | Shaffer ................ G08G 1/14 340/932.2 |
| 2015/0302750 | A1* | 10/2015 | Choi ..................... G08G 1/141 340/932.2 |
| 2016/0075377 | A1* | 3/2016 | Tomozawa ......... B62D 15/028 701/41 |
| 2016/0077525 | A1* | 3/2016 | Tomozawa ............ B62D 6/002 701/25 |

(Continued)

FOREIGN PATENT DOCUMENTS

| EP | 2 653 367 A2 | 10/2013 |
| JP | 2005-335568 A | 12/2005 |

(Continued)

OTHER PUBLICATIONS

Communication dated Aug. 2, 2016 from the Japanese Patent Office in counterpart Application No. 2014-186826.

*Primary Examiner* — McDieunel Marc
*Assistant Examiner* — James E Stroud
(74) *Attorney, Agent, or Firm* — Sughrue Mion, PLLC

(57) ABSTRACT

A parking assist system includes an electronic control unit configured to detect a stopped vehicle, and to set a target position, to which a vehicle moves, to a position between a first stopped vehicle and a second stopped vehicle that are detected, the position being commensurate with a distance between the first stopped vehicle and the second stopped vehicle.

15 Claims, 14 Drawing Sheets

(56) References Cited

U.S. PATENT DOCUMENTS

| | | | |
|---|---|---|---|
| 2016/0101813 A1* | 4/2016 | Ishijima | B62D 5/04 701/41 |
| 2016/0107690 A1* | 4/2016 | Oyama | B62D 5/046 701/41 |
| 2016/0140403 A1* | 5/2016 | Nagata | B60R 1/06 382/104 |
| 2016/0185389 A1* | 6/2016 | Ishijima | B62D 15/0285 701/41 |

FOREIGN PATENT DOCUMENTS

| | | |
|---|---|---|
| JP | 2006-1301 A | 1/2006 |
| JP | 2011-524298 A | 9/2011 |
| JP | 2013-220802 A | 10/2013 |

\* cited by examiner

F I G . 14
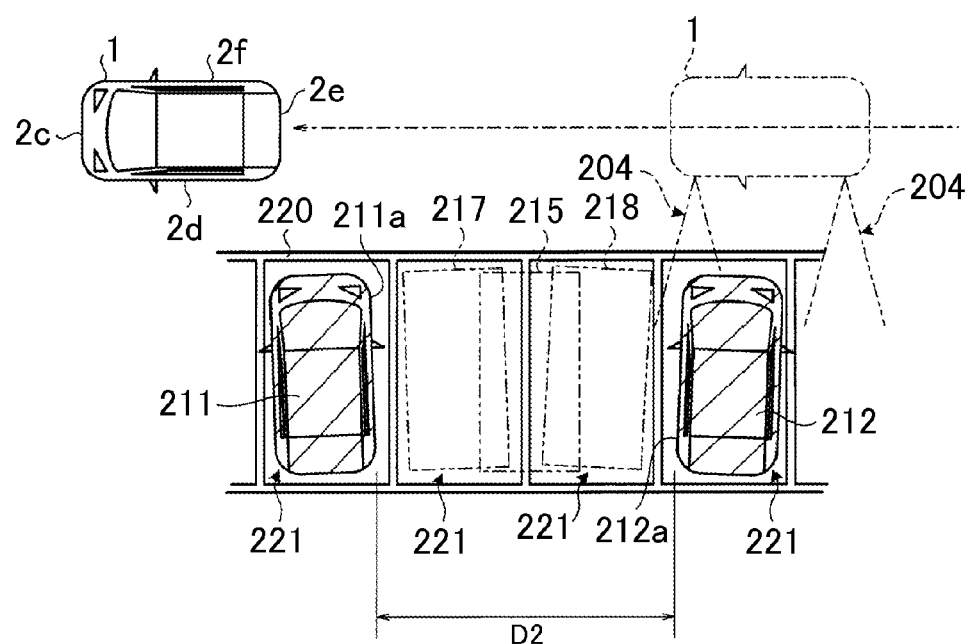

PARKING ASSIST SYSTEM

INCORPORATION BY REFERENCE

The disclosure of Japanese Patent Application No. 2014-186826 filed on Sep. 12, 2014 including the specification, drawings and abstract is incorporated herein by reference in its entirety.

BACKGROUND OF THE INVENTION

1. Field of the Invention

The invention relates to a parking assist system.

2. Description of Related Art

A parking assist system for assisting in parking a vehicle may be implemented in the vehicle. The parking assist system, for example, sets a target position to which a vehicle moves, on the basis of another stopped vehicle or a partition line. The parking assist system guides the vehicle to the target position.

When there is a space between two stopped vehicles, the parking assist system is able to set a target position in the space. The parking assist system sets a target position at a predetermined distance from each of the stopped vehicles (for example, Japanese Patent Application Publication No. 2005-335568 (JP 2005-335568 A)).

A distance between two stopped vehicles may be longer than a distance that is used to stop a vehicle. In this case, for example, a driver sets a desired target position from among a plurality of candidates for a target position, displayed on a screen of a display device.

SUMMARY OF THE INVENTION

An aspect of the invention provides a parking assist system. The parking assist system includes an electronic control unit configured to detect a stopped vehicle, and to set a target position, to which a vehicle moves, to a position between a first stopped vehicle and a second stopped vehicle that are detected, the position being commensurate with a distance between the first stopped vehicle and the second stopped vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where a part of a cabin is seen through;

FIG. 14 is an exemplary plan view that schematically shows a second example of a vehicle that double parks according to the embodiment.

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may provide at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
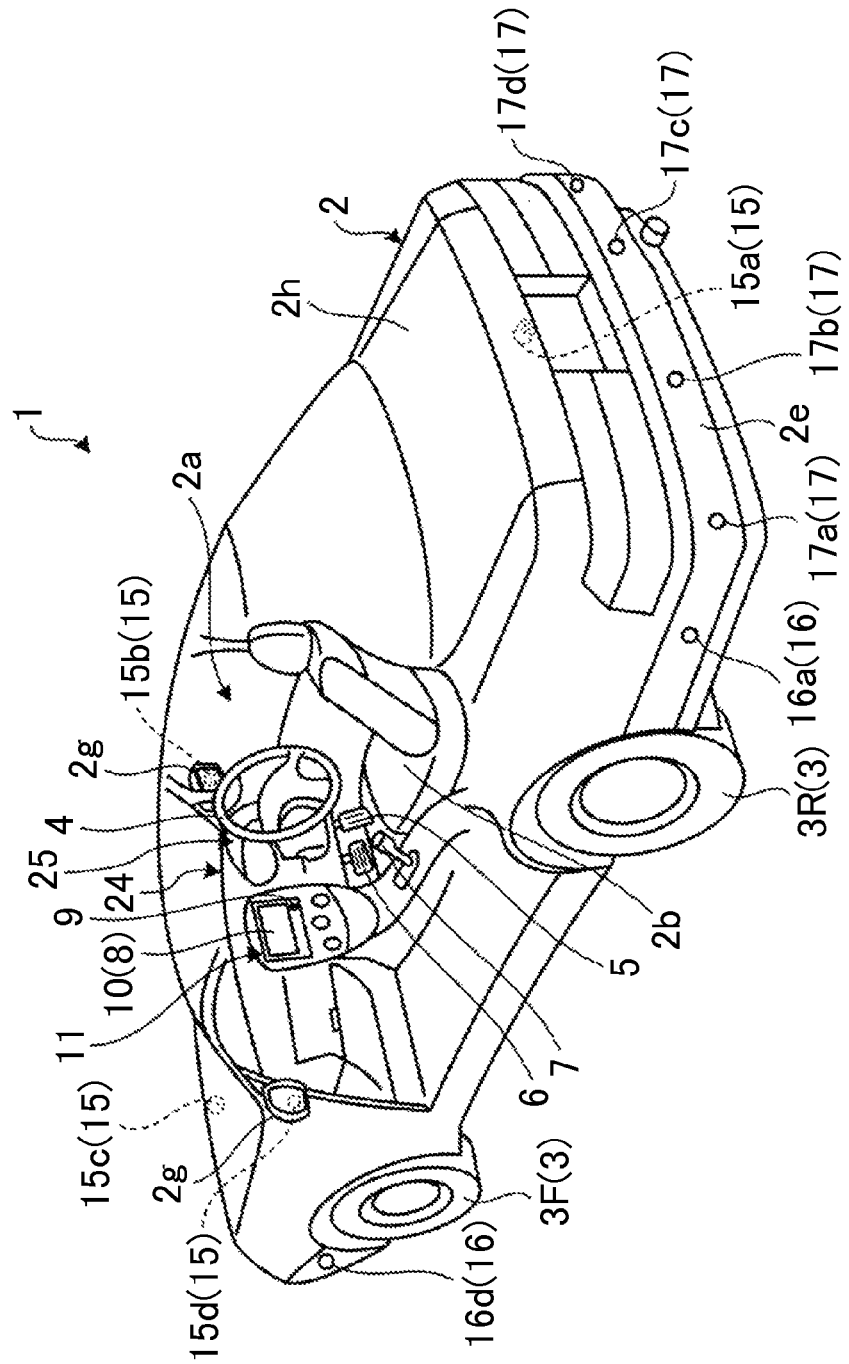

As illustrated in FIG. 1, a vehicle body 2 constitutes a cabin 2*a* in which an occupant (not shown) is seated. A steering unit 4, an accelerator operation unit 5, a brake operation unit 6, a shift operation unit 7, and the like, are provided near a seat 2*b* of a driver as an occupant inside the cabin 2*a*. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a transparent or translucent operation input unit 10, such as a touch panel. An occupant is allowed to visually recognize an image that is displayed on the display screen of the display device 8 via the operation input unit 10. An occupant is allowed to perform operation input (i.e., the input of an operation) by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at a position inside the cabin 2a, which is different from the position of the monitor device 11. Voice and/or sound (audio data) may be output from the audio output device 9 of the monitor device 11 and another audio output device. The monitor device 11 is, for example, shared with a navigation system or an audio system.

Figure 3:
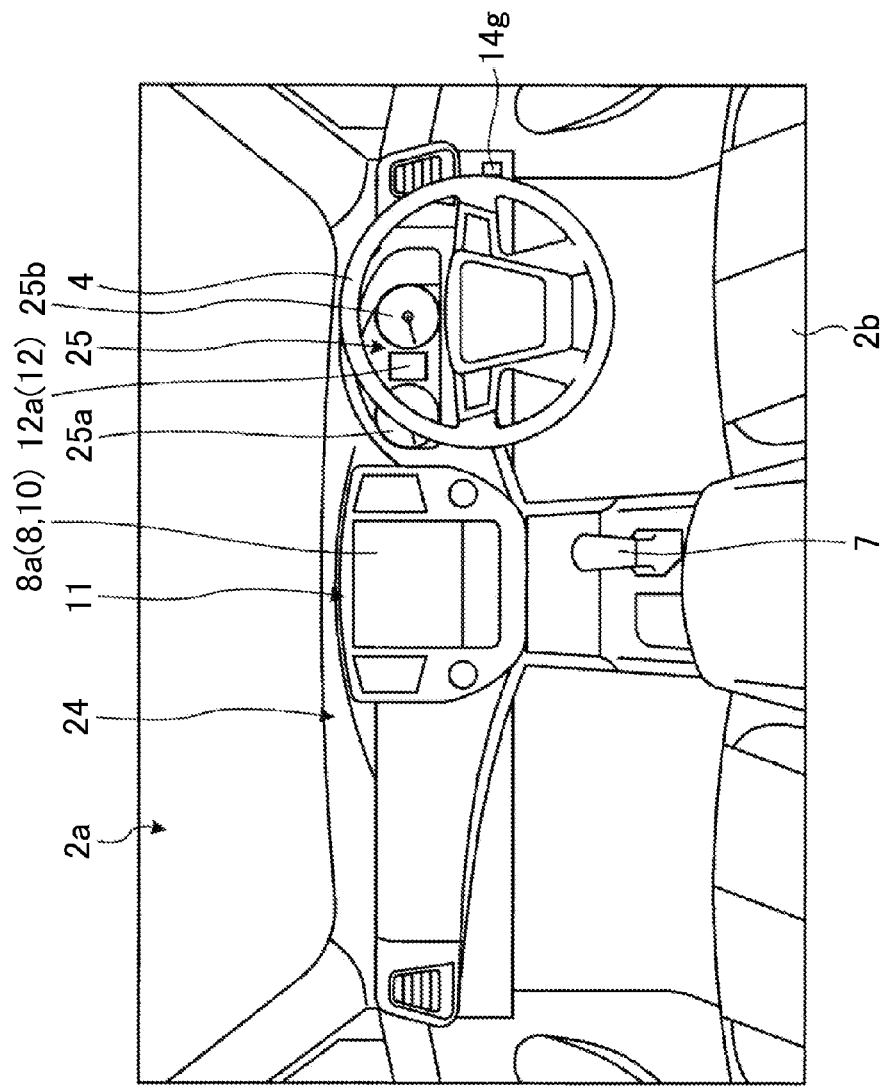
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
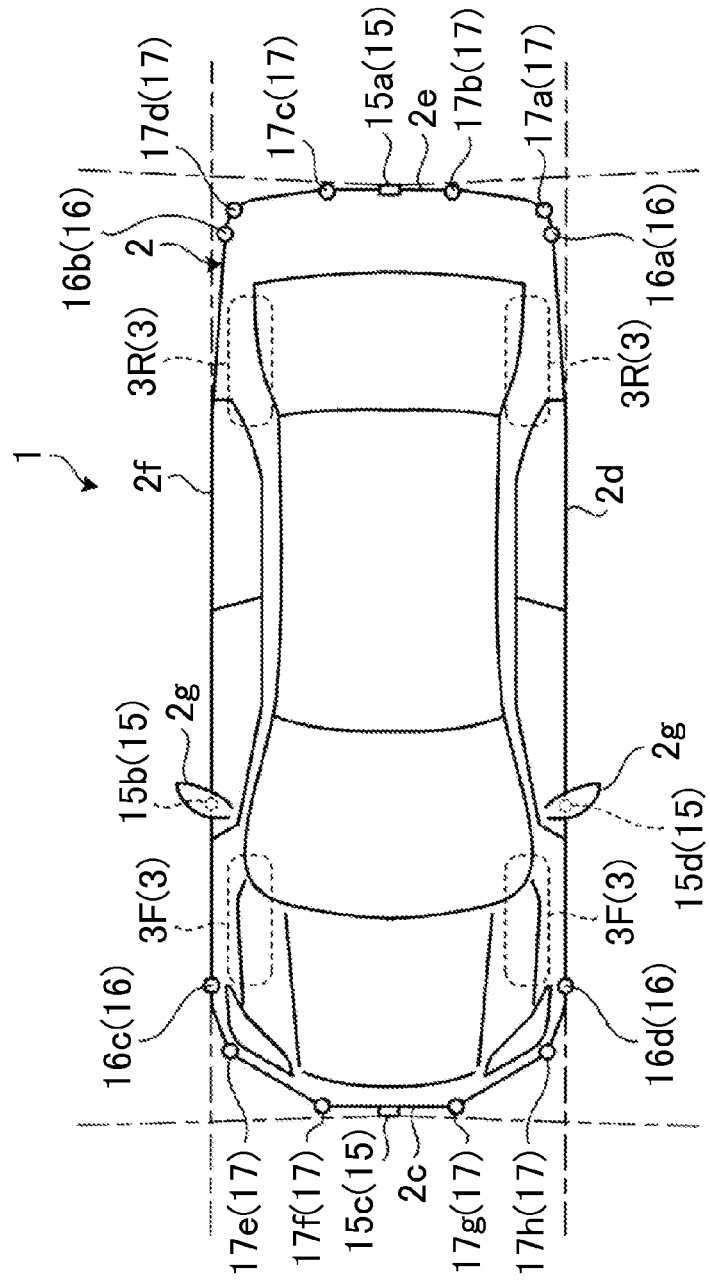
FIG. 2 is an exemplary plan view (bird's-eye view) of the vehicle according to the embodiment.
Figure 4:
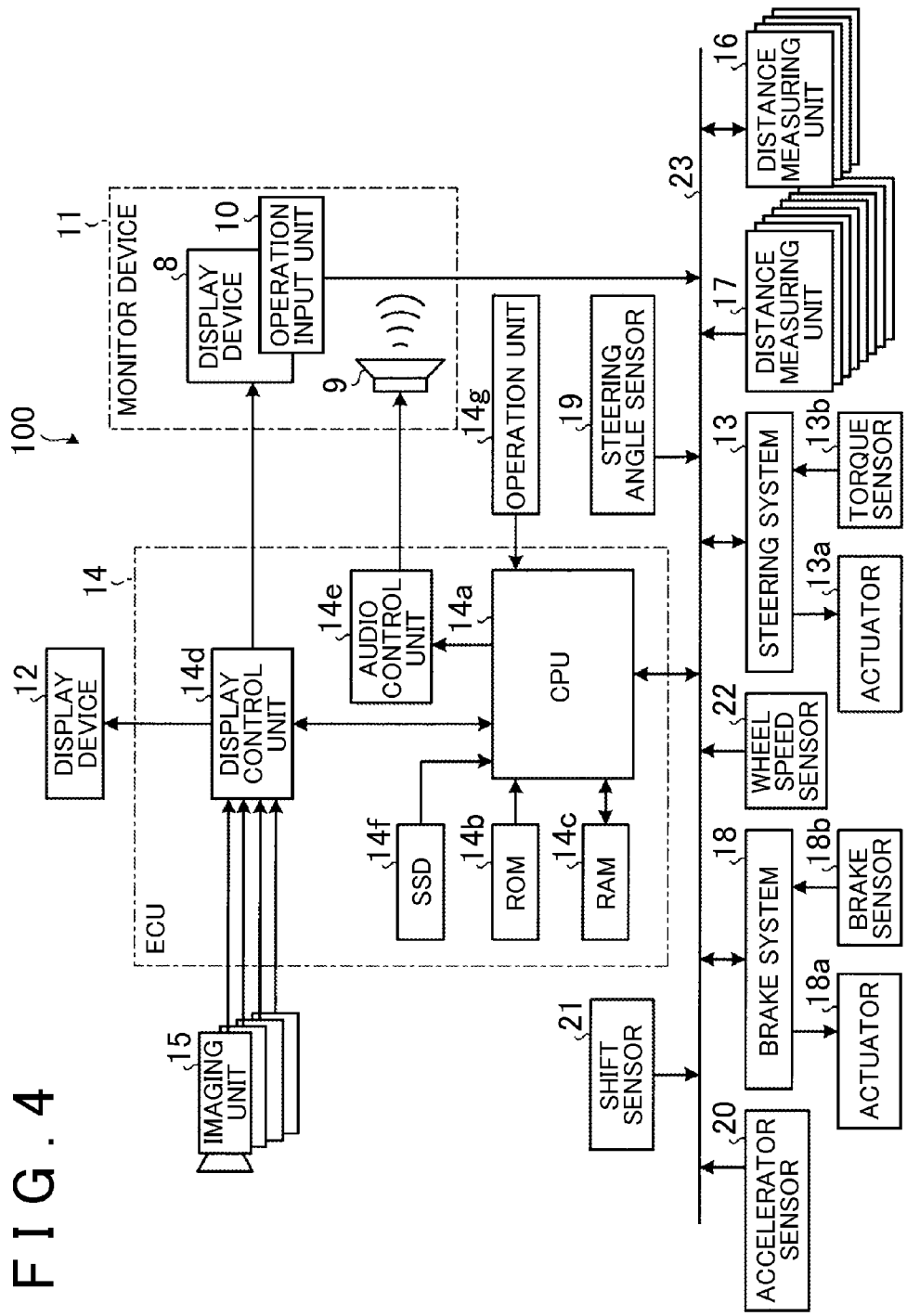
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that includes an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures an image of a road surface on which the vehicle 1 may move and an outside environment around the vehicle body 2, including an area in which the vehicle 1 may be parked, and outputs the captured image as captured image data.

The imaging unit 15a is, for example, located at a rear end 2e of the vehicle body 2, and is provided at a lower wall portion of a door 2h of a rear boot (rear trunk). The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object on the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14 includes, for example, a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and controls, such as image processing related to images that are displayed on the display devices 8, 12, determination of a moving target position of the vehicle 1 (i.e., determination of a target position to which the vehicle 1 moves), computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may include another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, accordingly, imparts braking force to the vehicle 1, via an actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
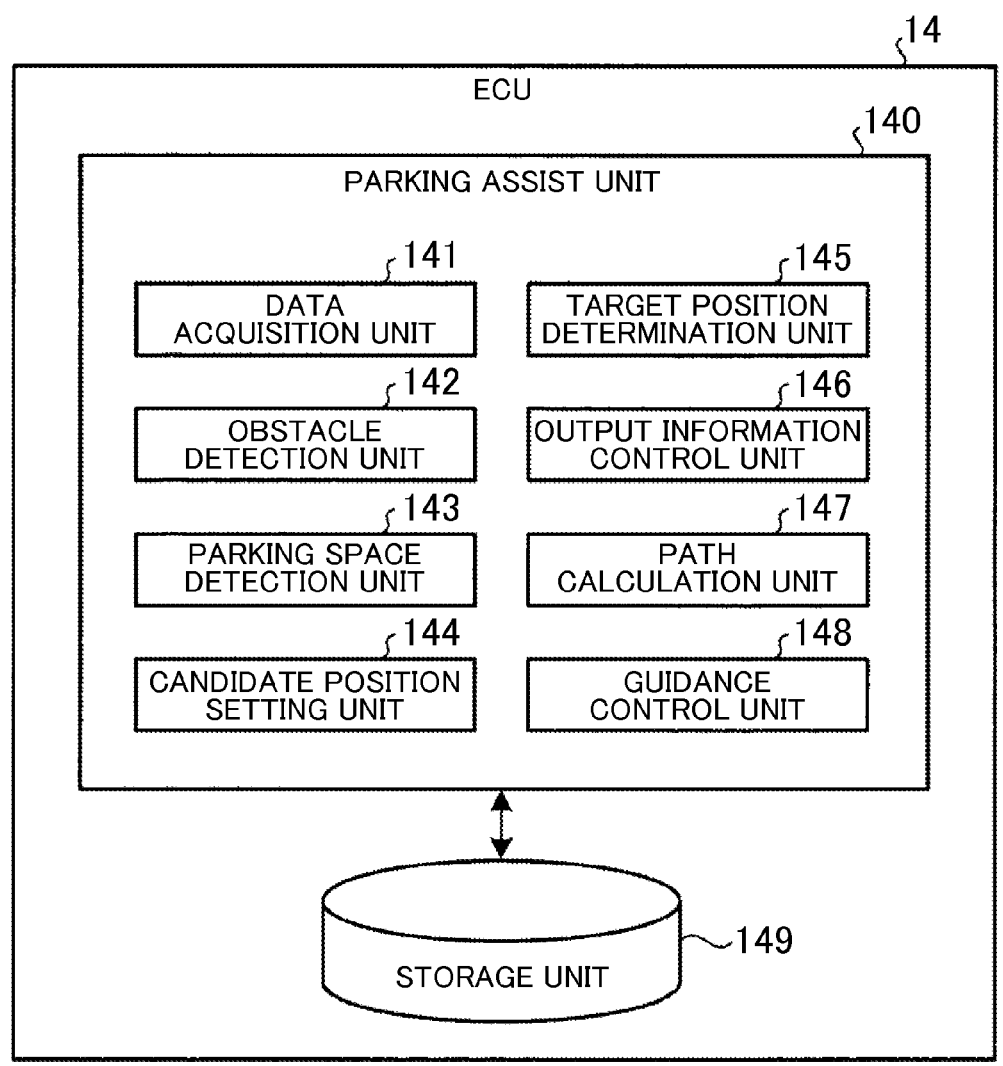
FIG. 5 is an exemplary block diagram of the configuration of an ECU of the parking assist system according to the embodiment.

Next, the configuration of a parking assist unit 140 that is implemented in the ECU 14 will be described. As shown in FIG. 5, the parking assist unit 140 includes a data acquisition unit 141, an obstacle detection unit 142, a parking space detection unit 143, a candidate position setting unit 144, a target position determination unit 145, an output information control unit 146, a path calculation unit 147, a guidance control unit 148, and the like. In addition, the ECU 14 includes a storage unit 149.

The components in the parking assist unit 140 shown in FIG. 5 are implemented when the CPU 14a configured as the parking assist ECU 14 shown in FIG. 4, for example, executes a parking assist program stored in the ROM 14b. That is, the parking assist unit 140 executes the parking assist program stored in the ROM 14b to implement the data acquisition unit 141, the obstacle detection unit 142, the parking space detection unit 143, the candidate position setting unit 144, the target position determination unit 145, the output information control unit 146, the path calculation unit 147, the guidance control unit 148, and the like. These components may be configured to be implemented by hardware. The storage unit 149 is, for example, implemented by the RAM 14c or the SSD 14f.

The data acquisition unit 141 acquires various pieces of information, such as detected results of the sensors and distance measuring units 16, 17, image data obtained by the imaging units 15 and signals resulting from the operation input through the operation input unit 10, the operation unit 14g, and the like. The operation unit 14g is, for example, a push button, a switch, or the like. The obstacle detection unit 142 detects an obstacle on the basis of information acquired by the data acquisition unit 141. The parking space detection unit 143 detects a parking space on the basis of information acquired by the data acquisition unit 141. The candidate position setting unit 144 sets a candidate position for the moving target position of the vehicle 1. The target position determination unit 145 determines the moving target position of the vehicle 1 (i.e., the target position to which the vehicle 1 moves). The output information control unit 146 determines information that is output through the display device 12, the display device 8, the audio output device 9, or the like, an output mode of the information, and the like. The path calculation unit 147 calculates a moving path to the moving target position of the vehicle 1. The guidance control unit 148 controls portions of the vehicle 1 such that the vehicle 1 moves to the moving target position along the moving path. The storage unit 149 stores data that are used in computation in the ECU 14 or data calculated in computation in the ECU 14.

Figure 6:
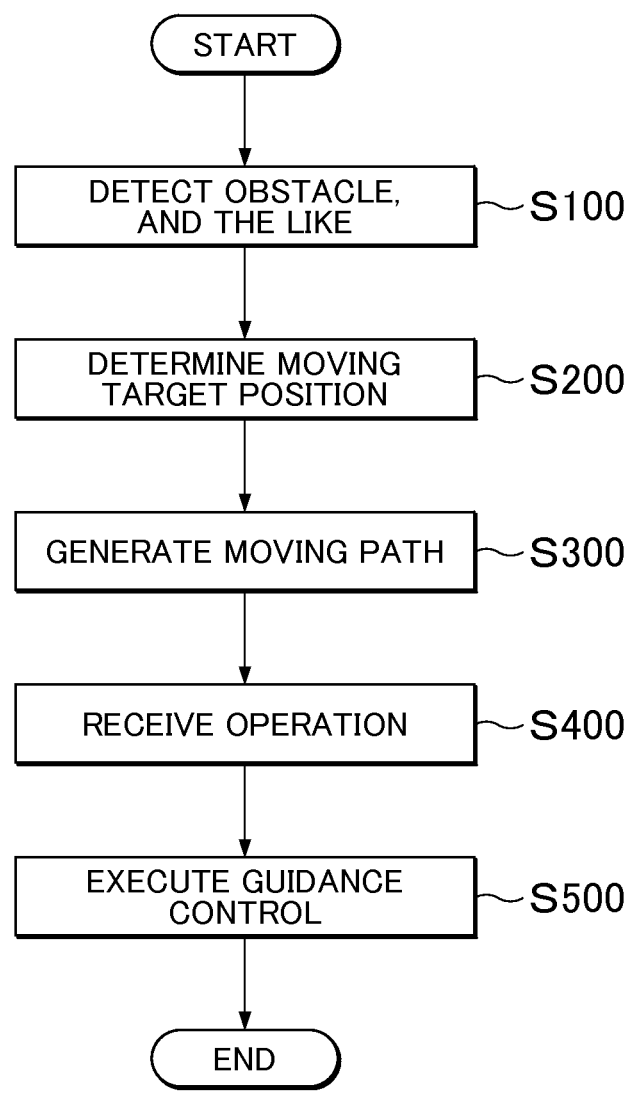
FIG. 6 is an exemplary flowchart of the procedure of a parking assist process that is executed by a parking assist unit according to the embodiment.

Next, an example of a parking assist process that is executed by the parking assist unit 140 according to the present embodiment will be schematically described. The parking assist process that will be described below is one example, and may be partially omitted or modified. FIG. 6 is a flowchart that shows an example of the procedure of the parking assist process that is executed by the parking assist unit 140.

Initially, while the vehicle 1 is moving, the parking assist unit 140 detects a vehicle (stopped vehicle) stopped around the vehicle 1, an obstacle, such as a curb, a partition line, or the like (S100). For example, the obstacle detection unit 142 detects a stopped vehicle or an obstacle on the basis of detected results of the distance measuring units 16, 17, acquired by the data acquisition unit 141, or image data obtained by the imaging units 15. The parking space detection unit 143 detects a parking space on the basis of the detected stopped vehicle, obstacle, partition line, or the like. An obstacle, or the like, may be constantly detected or may be detected, for example, when the speed of the vehicle 1 is lower than a preset value. Detection of an obstacle, or the like, may be started after a driver operates the operation unit 14g.

Subsequently, the parking assist unit 140 determines the moving target position of the vehicle 1 (S200). For example, the candidate position setting unit 144 sets at least one candidate position on the basis of the detected stopped vehicle, or the like, or the detected parking space. The target position determination unit 145 determines at least one moving target position of the vehicle 1 from the at least one candidate position.

Subsequently, the parking assist unit 140 generates a moving path of the vehicle 1 (S300). For example, the path calculation unit 147 generates at least one moving path to the determined moving target position. For example, the path calculation unit 147 respectively generates moving paths for moving the vehicle 1 to the moving target position by front-end parking, double parking and parallel parking.

Subsequently, the parking assist unit 140 receives operation input (i.e., the input of an operation) for selecting or determining a parking assist function (S400). For example, when the driver operates the operation unit 14g, the output information control unit 146, which has acquired an input signal due to the operation via the data acquisition unit 141, causes the screen 12a of the display device 12 or the screen 8a of the display device 8 to display a screen for selecting the parking assist function. For example, the driver selects the parking assist function for any one of front-end parking, double parking and parallel parking. When the driver determines the parking assist function, the parking assist function starts.

Subsequently, the parking assist unit 140 executes guidance control over the vehicle 1 on the basis of the selected parking assist function (S500). For example, the guidance control unit 148 controls the steering system 13 on the basis of the parking assist function selected by the driver, and automatically steers the wheels 3, thus assisting in parking the vehicle 1 (automatic steering). When the driver operates the accelerator operation unit 5, the brake operation unit 6 or the shift operation unit 7, the vehicle 1 moves to the moving target position along the moving path corresponding to the selected parking assist function. When a distance between the vehicle 1 and the moving target position falls within a predetermined value, the guidance control ends. Also, when a predetermined operation is performed on the steering unit 4, the accelerator operation unit 5, the brake operation unit 6 or the shift operation unit 7, the guidance control ends (the guidance control is cancelled). During guidance control, the target position determination unit 145 and the path calculation unit 147 may reset the moving target position and moving path of the vehicle 1 depending on a situation.

The guidance control unit 148 may assist in parking the vehicle 1 by automatically operating not only the steering system 13 but also the accelerator operation unit 5, the brake operation unit 6 and the shift operation unit 7 (automatic operation). The parking assist unit 140 may assist driver's operation in parking the vehicle by displaying the moving target position or the moving path on the display device 12 at the time when the vehicle 1 moves to be parked (steering guidance).

In the above-described parking assist process, for example, the target position determination unit 145 may determine the moving target position without utilizing the candidate position set by the candidate position setting unit 144. After the parking assist unit 140 receives the operation input for selecting and determining the parking assist function (S400), the parking assist unit 140 may determine the moving target position and generate the moving path (S200, S300).

Figure 7:
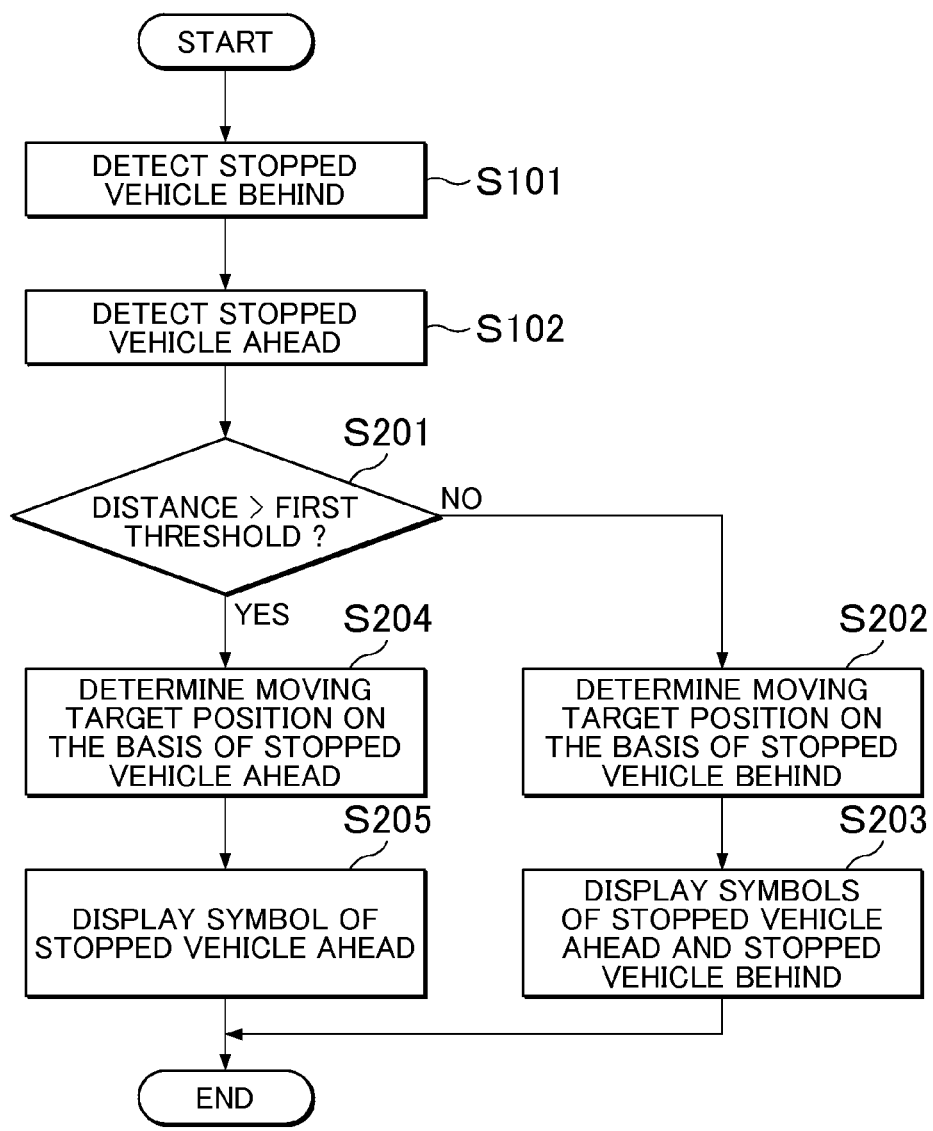
FIG. 7 is an exemplary flowchart that shows an example of the procedure of a process of determining a moving target position for parallel parking, which is executed by the parking assist unit according to the embodiment.
Figure 8:
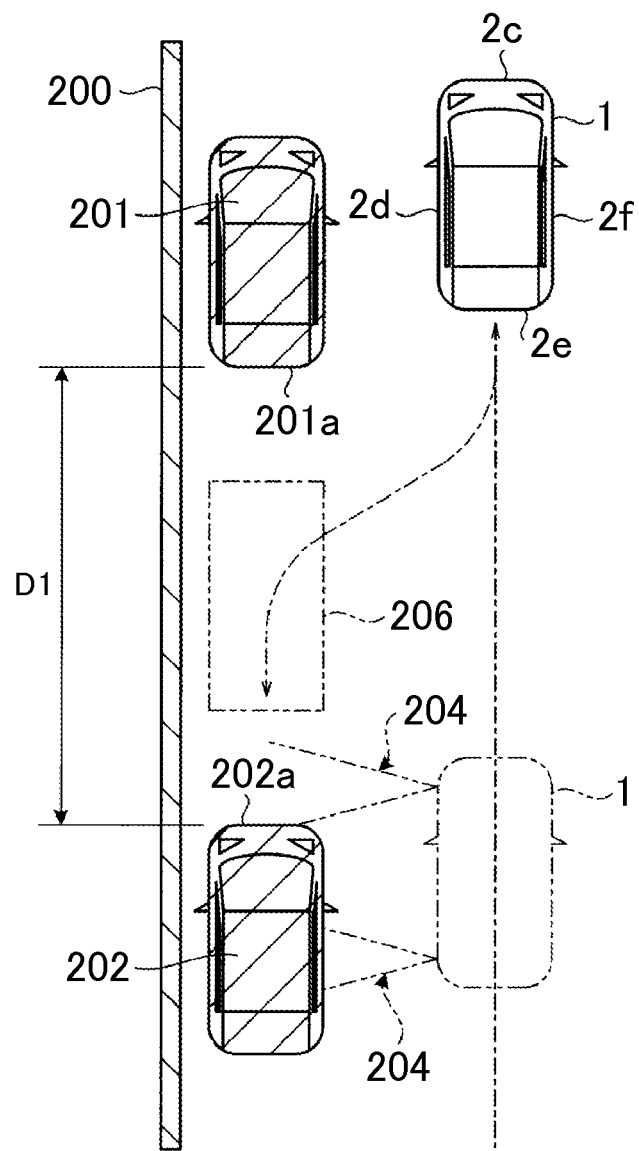
FIG. 8 is an exemplary plan view that schematically shows a first example of a vehicle that parallel parks according to the embodiment.

Hereinafter, determination of the moving target position for parallel parking, which is performed by the parking assist unit 140, will be described in detail. FIG. 7 is a flowchart that shows an example of the procedure of a process of determining the moving target position for parallel parking, which is executed by the parking assist unit 140. FIG. 8 is a plan view that schematically shows a first example of the vehicle 1 that parallel parks.

As in the first example shown in FIG. 8, when a stopped vehicle 201 ahead and a stopped vehicle 202 behind are stopped along a curb 200, the parking assist unit 140 is able to execute a parallel parking assist function for parallel parking the vehicle 1 between the stopped vehicle 201 ahead and the stopped vehicle 202 behind. The stopped vehicle 201 ahead is another vehicle that is stopped (parked) ahead of the stopped vehicle 202 behind in the traveling direction of the vehicle 1, and is an example of a first stopped vehicle. The stopped vehicle 202 behind is another vehicle that is stopped (parked) behind the stopped vehicle 201 ahead in the traveling direction of the vehicle 1, and is an example of a second stopped vehicle. The stopped vehicle 201 ahead and the stopped vehicle 202 behind may be placed at an angle with respect to the curb 200.

Parallel parking in the present embodiment is a parking method for reversing the vehicle 1 (causing the vehicle 1 to back up) and parking the vehicle 1 such that the vehicle 1 is in tandem with (in other words, the vehicle 1 is substantially aligned with) another vehicle, such as the stopped vehicle 201 ahead and the stopped vehicle 202 behind. FIG. 8 shows an example of the moving path of the vehicle 1 traveling forward on a road and an example of the moving path of the vehicle 1 that parallel parks by the alternate long and short dash lines. The front end of the parallel parked vehicle 1 faces the rear end of another vehicle ahead. The rear end of the parallel parked vehicle 1 faces the front end of another vehicle behind. Parallel parking provided by the parallel parking assist function that is executable by the parking assist unit 140 is not limited to this mode.

The vehicle 1 moves forward and passes by the stopped vehicle 201 ahead and the stopped vehicle 202 behind. While the vehicle 1 is traveling, the distance measuring units 16 respectively emit ultrasonic waves 204 from the side portions of the vehicle 1 at constant time intervals, and capture reflected waves of the ultrasonic waves 204. FIG. 8 schematically shows ranges to which the ultrasonic waves 204 are emitted by the alternate long and two-short dashes lines. The obstacle detection unit 142 detects an object on the side of the vehicle 1 on the basis of the detected results of the distance measuring units 16, which are acquired by the data acquisition unit 141.

Initially, when the vehicle 1 passes by the side of the stopped vehicle 202 behind, the obstacle detection unit 142 detects the stopped vehicle 202 behind (S101). When the vehicle 1 passes by the side of the stopped vehicle 201 ahead, the obstacle detection unit 142 detects the stopped vehicle 201 ahead (S102). In this way, the obstacle detection unit 142 is an example of the detection unit.

Subsequently, the candidate position setting unit 144 determines whether a distance D1 between the stopped vehicle 201 ahead and the stopped vehicle 202 behind is longer than a first threshold (S201). The distance D1 is a distance between a rear end 201*a* of the stopped vehicle 201 ahead, detected by the obstacle detection unit 142, and a front end 202*a* of the stopped vehicle 202 behind, detected by the obstacle detection unit 142. The candidate position setting unit 144 calculates the distance D1 when the obstacle detection unit 142 detects the stopped vehicle 202 behind and the stopped vehicle 201 ahead.

The first threshold is stored in the storage unit 149 in advance. The first threshold is, for example, a value obtained by adding a predetermined distance to the shortest distance that is utilized by the vehicle 1 for parallel parking. In the present embodiment, the first threshold is, for example, a value that is twice as long as the shortest distance that is utilized by the vehicle 1 for parallel parking. The first threshold is not limited to this value.

The shortest distance that is utilized by the vehicle 1 for parallel parking is, for example, a distance obtained by adding a predetermined value to the overall length of the vehicle 1 or multiplying the overall length of the vehicle 1 by a predetermined value, and then adding a predetermined distance for safety to the resultant value. When there is the shortest distance between the stopped vehicle 201 ahead and the stopped vehicle 202 behind, the vehicle 1 is allowed to parallel park in the space between the stopped vehicle 201 ahead and the stopped vehicle 202 behind without turning the steering wheel (without changing the moving direction of the vehicle 1 between a forward direction and a reverse direction). In the present embodiment, the shortest distance that is utilized by the vehicle 1 for parallel parking is, for example, a distance obtained by adding 3400 mm to the overall length of the vehicle 1. The shortest distance that is utilized by the vehicle 1 for parallel parking is not limited to this distance. When the distance D1 is shorter than the shortest distance that is utilized by the vehicle 1 for parallel parking, the parking assist unit 140 may determine that it is not possible to execute the parallel parking assist function.

The candidate position setting unit 144 acquires the first threshold from the storage unit 149, and compares the distance D1 with the first threshold. When the distance D1 is shorter than or equal to the first threshold (No in S201), the candidate position setting unit 144 sets a candidate position on the basis of the stopped vehicle 202 behind. For example, the candidate position setting unit 144 sets a candidate position to a position that is located between the stopped vehicle 201 ahead and the stopped vehicle 202 behind and that is spaced a predetermined distance from the front end 202*a* of the stopped vehicle 202 behind. A distance between the front end 202*a* of the stopped vehicle 202 behind and the candidate position is, for example, 500 mm; however, the distance is not limited to this value. The target position determination unit 145 determines the candidate position as the moving target position 206 (S202). FIG. 8 shows the moving target position 206 by the alternate long and two-short dashes line.

Figure 9:
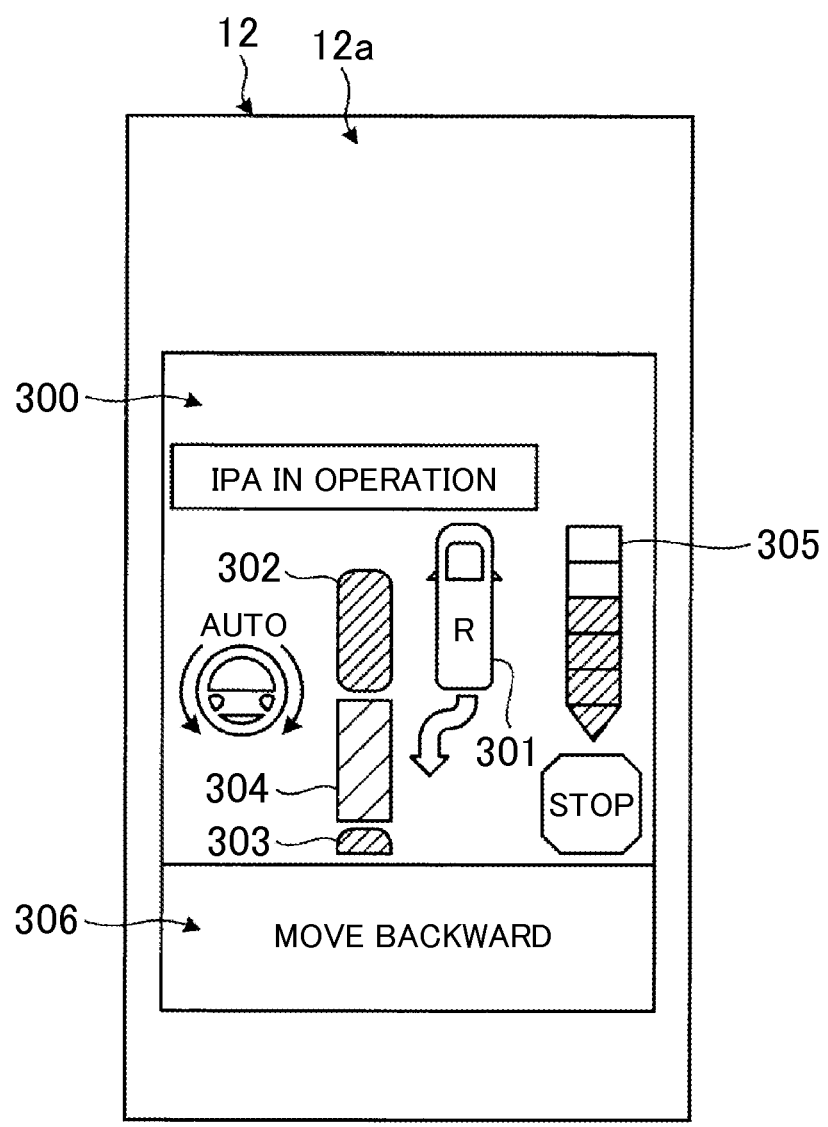
FIG. 9 is an exemplary view that shows a first example of a screen of a display device according to the embodiment.

FIG. 9 is a view that shows a first example of the screen 12*a* of the display device 12. After the moving target position 206 is determined, the parking assist unit 140 receives the operation input for determining the parking assist function (S400 of FIG. 6), and executes the guidance control over the vehicle 1 based on the parallel parking assist function (S500 of FIG. 6). While the guidance control unit 148 is executing the guidance control over the vehicle 1, the output information control unit 146 causes the screen 12*a* of the display device 12 to display a command screen 300 shown in FIG. 9.

The command screen 300 includes a vehicle symbol 301, a forward vehicle symbol 302, a rear vehicle symbol 303, a target position symbol 304, an indicator 305 and a text information display region 306. The vehicle symbol 301 schematically represents the vehicle 1. The forward vehicle symbol 302 schematically represents the stopped vehicle 201 ahead. The rear vehicle symbol 303 schematically represents the stopped vehicle 202 behind. The target position symbol 304 schematically represents the moving target position 206. The indicator 305 indicates a distance between the vehicle 1 and the moving target position 206 along the moving path, and the traveling direction of the vehicle 1. The display region 306 displays text information that provides a notice to the driver.

The forward vehicle symbol 302, the rear vehicle symbol 303 and the target position symbol 304 are arranged (aligned) in a line. The target position symbol 304 is arranged between the forward vehicle symbol 302 and the rear vehicle symbol 303. With the symbols 301 to 304, the command screen 300 indicates that the vehicle 1 parallel parks at the moving target position 206 between the stopped vehicle 201 ahead and the stopped vehicle 202 behind. The driver is allowed to parallel park the vehicle 1 at the moving target position 206 by, for example, operating the accelerator operation unit 5, the brake operation unit 6 and the shift operation unit 7 in accordance with the text information in the display region 306.

As described above, the output information control unit 146 controls the display device 12 such that the display device 12 displays the vehicle symbol 301, the forward vehicle symbol 302 and the rear vehicle symbol 303 (S203). The vehicle symbol 301 is an example of a first image. The forward vehicle symbol 302 is an example of a second image. The rear vehicle symbol 303 is an example of a third image. The display device 12 is an example of a display unit.

Figure 10:
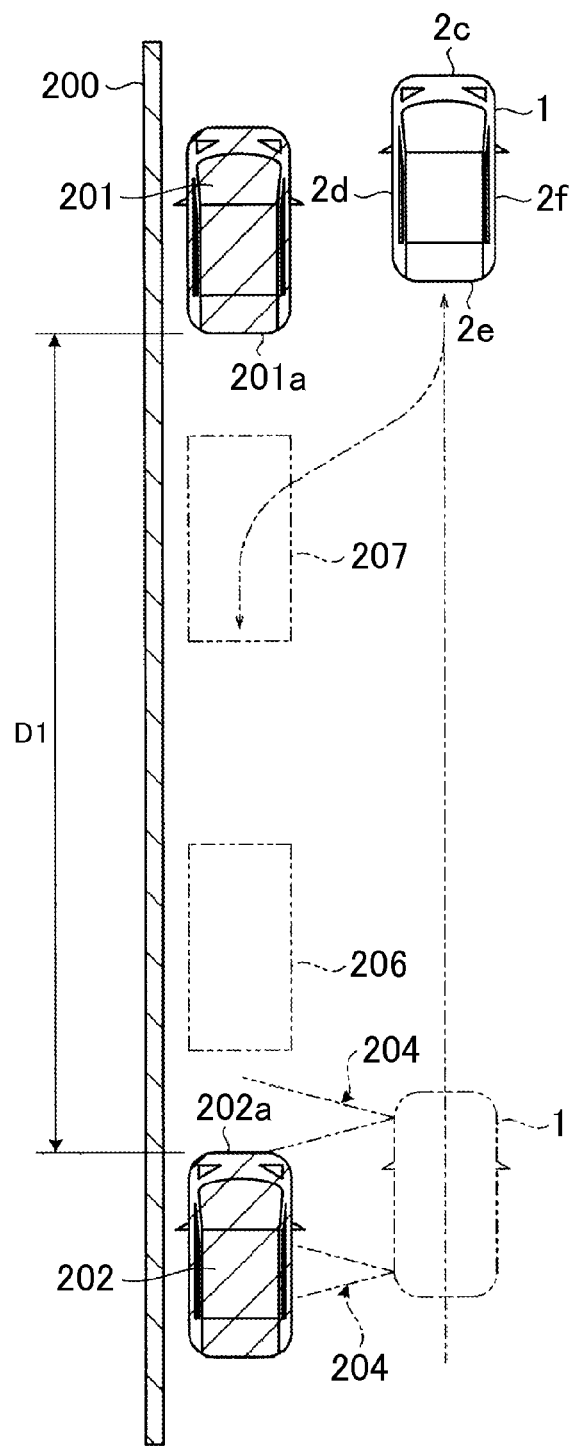
FIG. 10 is an exemplary plan view that schematically shows a second example of a vehicle that parallel parks according to the embodiment.

FIG. 10 is a plan view that schematically shows a second example of the vehicle 1 that parallel parks. In the second example shown in FIG. 10, the distance D1 is longer than the first threshold (Yes in S201). In this case, the candidate position setting unit 144 sets a candidate position based on the stopped vehicle 201 ahead. For example, the candidate position setting unit 144 sets a candidate position to a position that is located between the stopped vehicle 201 ahead and the stopped vehicle 202 behind and that is spaced a predetermined distance from the rear end 201a of the stopped vehicle 201 ahead. A distance between the rear end 201a of the stopped vehicle 201 ahead and the candidate position is, for example, 2900 mm; however, the distance is not limited to this value. The target position determination unit 145 determines the candidate position as a moving target position 207 (S204). FIG. 10 shows the moving target position 207 by the alternate long and two-short dashes line. FIG. 10 also shows the moving target position 206 based on the stopped vehicle 202 behind.

Hereinafter, the moving target position 207 will be described in detail. In the second example shown in FIG. 10, the candidate position setting unit 144 and the target position determination unit 145 may set the moving target position 206 based on the stopped vehicle 202 behind and the moving target position 207 based on the stopped vehicle 201 ahead.

A distance between the moving target position 207 and the stopped vehicle 201 ahead is shorter than a distance between the moving target position 207 and the stopped vehicle 202 behind. The moving target position 207 is a position that is adjacent to the stopped vehicle 201 ahead, and that is in tandem with (i.e., that is substantially aligned with) the stopped vehicle 201 ahead (in other words, the moving target position 207 is adjacent to the stopped vehicle 201 ahead, and is behind the stopped vehicle 201 ahead).

On the other hand, a distance between the moving target position 206 and the stopped vehicle 201 ahead is longer than a distance between the moving target position 206 and the stopped vehicle 202 behind. The moving target position 206 is a position that is adjacent to the stopped vehicle 202 behind, and that is in tandem with (in other words, that is substantially aligned with) the stopped vehicle 202 behind (in other words, the moving target position 206 is adjacent to the stopped vehicle 202 behind, and is ahead of the stopped vehicle 202 behind).

At a time at which the stopped vehicle 201 ahead is detected, the vehicle 1 is located forward of the stopped vehicle 201 ahead in the traveling direction of the vehicle 1. Therefore, a distance between the vehicle 1 and the stopped vehicle 201 ahead is shorter than a distance between the vehicle 1 and the stopped vehicle 202 behind. Therefore, a distance between the vehicle 1 and the moving target position 207 adjacent to the stopped vehicle 201 ahead is shorter than a distance between the vehicle 1 and the moving target position 206 adjacent to the stopped vehicle 202 behind.

The target position determination unit 145 sets the above-described moving target position 207. Therefore, a moving distance of the vehicle 1 in this case is shorter than the moving distance in the case where the target position determination unit 145 sets the moving target position 206. A distance that allows the vehicle 1 to easily move to a roadway is provided between the stopped vehicle 201 ahead and the vehicle 1 stopped at the moving target position 207.

Figure 11:
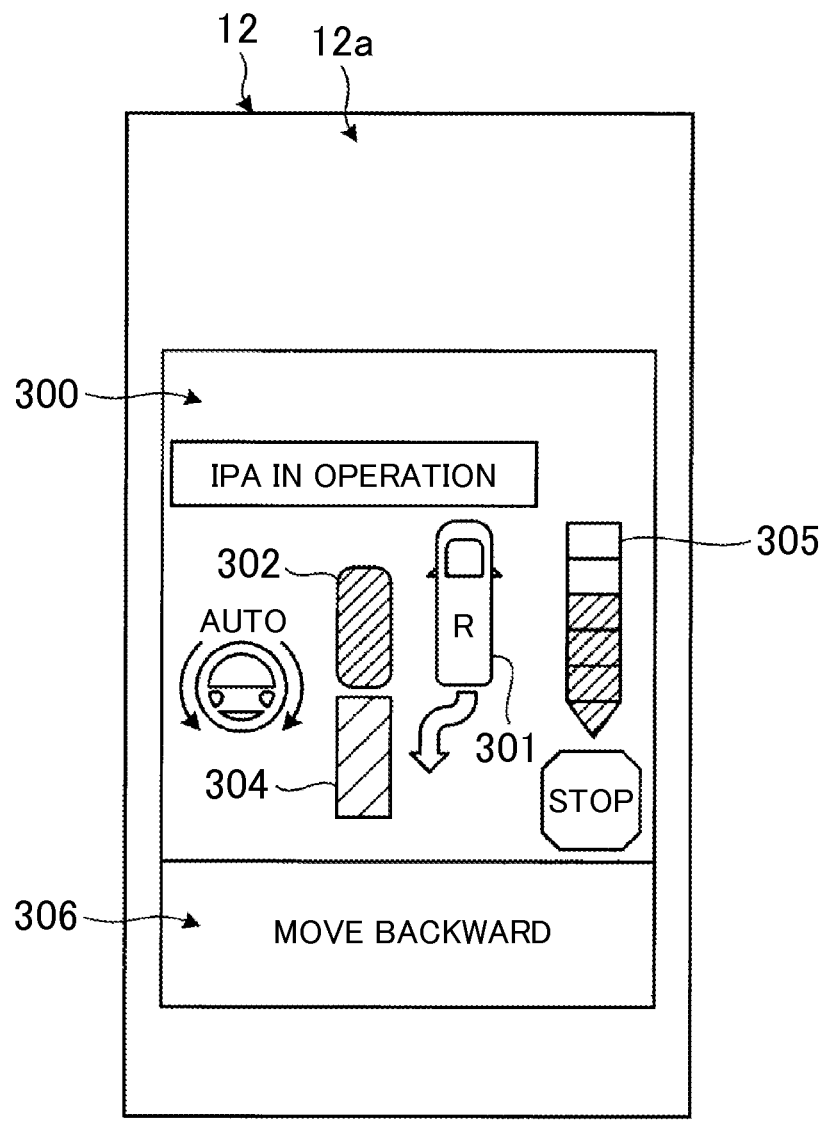
FIG. 11 is an exemplary view that shows a second example of a screen of a display device according to the embodiment.

FIG. 11 is a view that shows a second example of the screen 12a of the display device 12. When the target position determination unit 145 determines the moving target position 207, the output information control unit 146 causes the screen 12a of the display device 12 to display the command screen 300 shown in FIG. 11.

The command screen 300 shown in FIG. 11 displays the vehicle symbol 301, the forward vehicle symbol 302 and the target position symbol 304. The target position symbol 304 shown in FIG. 11 schematically shows the moving target position 207.

On the other hand, the command screen 300 does not display the rear vehicle symbol 303 shown in FIG. 9. That is, the output information control unit 146 controls the display device 12 such that the display device 12 displays the vehicle symbol 301 and the forward vehicle symbol 302 (S205). Thus, the command screen 300 shows that the moving target position 207 based on the stopped vehicle 201 ahead is set. In this way, the output information control unit 146 controls the display device 12 such that the display device 12 displays at least one of the vehicle symbol 301, the forward vehicle symbol 302 and the target position symbol 304 in accordance with the distance D1 between the stopped vehicle 201 ahead and the stopped vehicle 202 behind.

As described above, when the distance D1 between the stopped vehicle 201 ahead and the stopped vehicle 202 behind is shorter than or equal to the first threshold, the target position determination unit 145 determines the moving target position 206 based on the stopped vehicle 202 behind. On the other hand, when the distance D1 is longer than the first threshold, the target position determination unit 145 determines the moving target position 207 based on the stopped vehicle 201 ahead. In this way, the target position determination unit 145 automatically sets the moving target position 206 or moving target position 207 of the vehicle 1 to a position commensurate with the distance D1.

Figure 12:
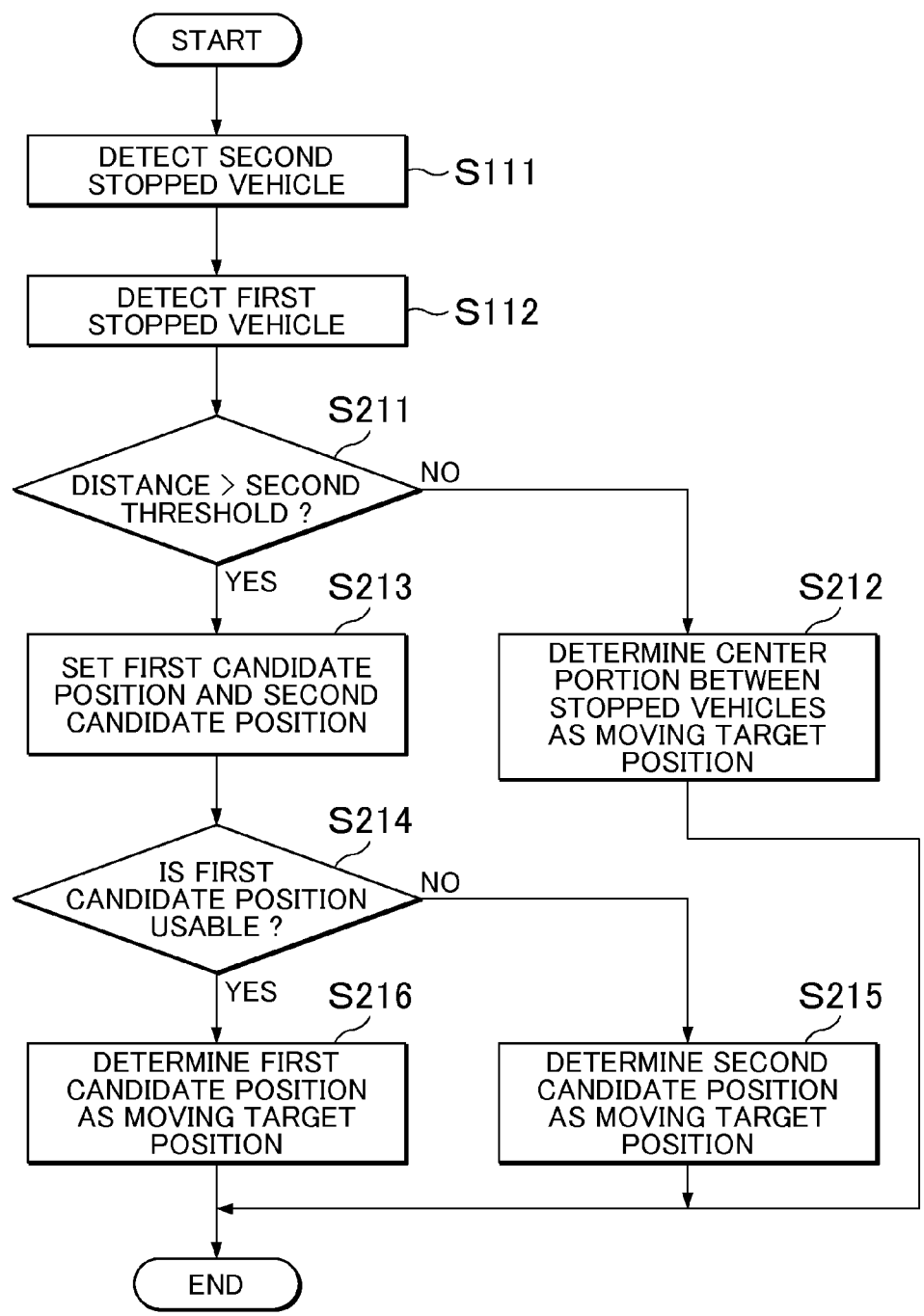
FIG. 12 is an exemplary flowchart that shows an example of the procedure of a process of determining a moving target position for double parking, which is executed by the parking assist unit according to the embodiment.
Figure 13:
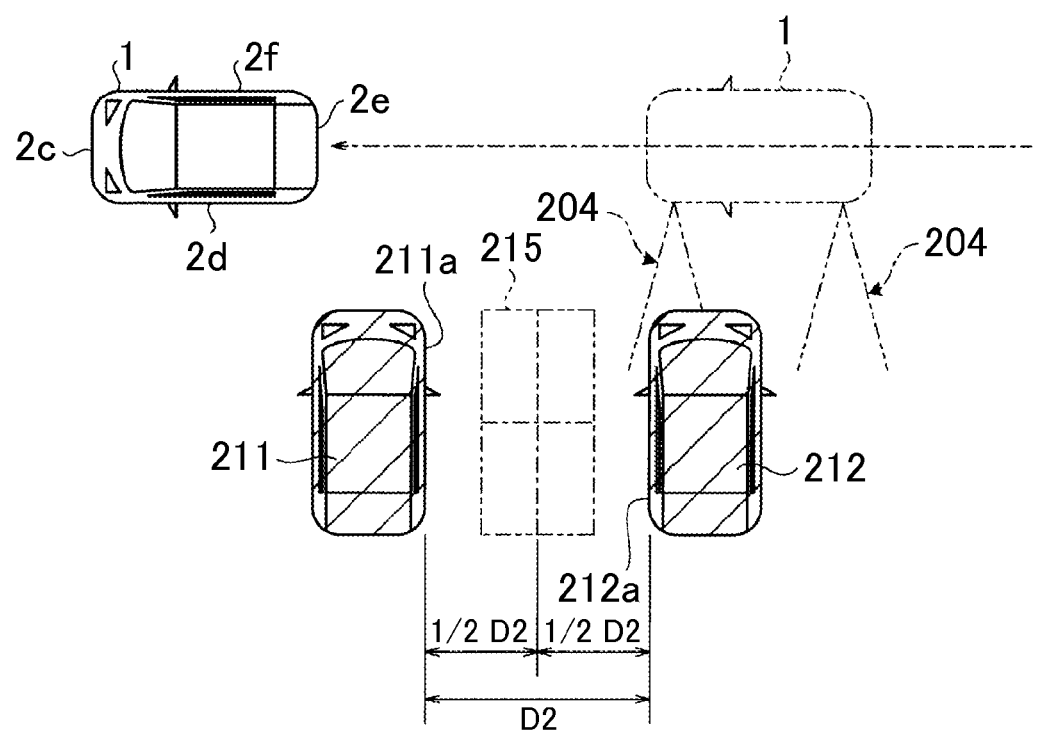
FIG. 13 is an exemplary plan view that schematically shows a first example of a vehicle that double parks according to the embodiment.

Hereinafter, determination of a moving target position for double parking, which is performed by the parking assist unit 140, will be described in detail. FIG. 12 is a flowchart that shows an example of the procedure of a process of determining a moving target position for double parking, which is executed by the parking assist unit 140. FIG. 13 is a plan view that schematically shows a first example of the vehicle 1 that double parks.

As in the first example shown in FIG. 13, when a first stopped vehicle 211 and a second stopped vehicle 212 are stopped in parallel with each other, the parking assist unit 140 is able to execute a double parking assist function for double parking the vehicle 1 between the first stopped vehicle 211 and the second stopped vehicle 212. The first stopped vehicle 211 is another vehicle that is stopped (parked) ahead of the second stopped vehicle 212 in the traveling direction of the vehicle 1. The second stopped vehicle 212 is another vehicle that is stopped (parked) behind the first stopped vehicle 211 in the traveling direction of the vehicle 1. The first stopped vehicle 211 and the second stopped vehicle 212 may be placed at an angle with respect to each other.

Double parking in the present embodiment is a parking method for reversing the vehicle 1 (causing the vehicle 1 to back up) and parking the vehicle 1 side by side with (in substantially parallel with) another vehicle, such as the first stopped vehicle 211 and the second stopped vehicle 212. FIG. 13 shows an example of a moving path of the vehicle 1 that travels forward on a road by the alternate long and short dash arrow. A side face of the double parked vehicle 1 faces a side face of another vehicle. Double parking in the double parking assist function that the parking assist unit 140 is able to execute is not limited to this mode.

The vehicle 1 moves forward and passes by the front of the first stopped vehicle 211 and the front of the second stopped vehicle 212. While the vehicle 1 is traveling, the distance measuring units 16 respectively emit ultrasonic waves 204 from the side of the vehicle 1 at constant time intervals, and capture reflected waves of the ultrasonic waves 204. The obstacle detection unit 142 detects an object on the side of the vehicle 1 on the basis of the detected results of the distance measuring units 16, which are acquired by the data acquisition unit 141.

Initially, when the vehicle 1 passes by the front of the second stopped vehicle 212, the obstacle detection unit 142 detects the second stopped vehicle 212 (S111). When the vehicle 1 passes by the front of the first stopped vehicle 211, the obstacle detection unit 142 detects the first stopped vehicle 211 (S112).

Subsequently, the candidate position setting unit 144 determines whether a distance D2 between the first stopped vehicle 211 and the second stopped vehicle 212 is longer than a second threshold (S211). The distance D2 is a distance between a right end 211a of the first stopped vehicle 211, detected by the obstacle detection unit 142, and a left end 212a of the second stopped vehicle 212, detected by the obstacle detection unit 142. The candidate position setting unit 144 calculates the distance D2 when the obstacle detection unit 142 detects the second stopped vehicle 212 and the first stopped vehicle 211.

The second threshold is stored in the storage unit 149 in advance. The second threshold is, for example, a value obtained by adding a predetermined width to the shortest width that is utilized by the vehicle 1 for double parking. In the present embodiment, the second threshold is, for example, a value that is twice as long as the shortest width that is used by the vehicle 1 for double parking. The second threshold is not limited to this value.

The shortest width that is utilized by the vehicle 1 for double parking is, for example, a width obtained by adding a predetermined width for opening or closing a door to the width of the vehicle 1 and then adding a predetermined width for safety to the resultant value. When the distance D2 is shorter than the shortest width that is utilized by the vehicle 1 for double parking, the parking assist unit 140 may determine that it is not possible to execute the double parking assist function. The candidate position setting unit 144 acquires the second threshold from the storage unit 149, and compares the distance D2 with the second threshold.

When the distance D2 is shorter than or equal to the second threshold (No in S211), the candidate position setting unit 144 sets a candidate position to the center portion between the first stopped vehicle 211 and the second stopped vehicle 212. For example, the candidate position setting unit 144 sets a candidate position to a position at which a distance between the center portion of the candidate position and the first stopped vehicle 211 is equal to a distance between the center portion of the candidate position and the second stopped vehicle 212. The distance between the center portion of the candidate position and the first stopped vehicle 211 is approximately half of the distance D2. The distance between the center portion of the candidate position and the second stopped vehicle 212 is also similarly approximately half of the distance D2. The target position determination unit 145 determines the candidate position as a moving target position 215 (S212). FIG. 13 shows the moving target position 215 by the alternate long and two-short dashes line.

FIG. 14 is a plan view that schematically shows a second example of the vehicle 1 that double parks. In the second example shown in FIG. 14, the distance D2 is longer than the second threshold (Yes in S211). In this case, the candidate position setting unit 144 sets a first candidate position 217 based on the first stopped vehicle 211 and a second candidate position 218 based on the second stopped vehicle 212 (S213). FIG. 14 shows the first candidate position 217 and the second candidate position 218 by the alternate long and two-short dashes line. FIG. 14 also shows the moving target position 215 provided at the center portion between the first stopped vehicle 211 and the second stopped vehicle 212.

The candidate position setting unit 144, for example, sets the first candidate position 217 to a position that is located between the first stopped vehicle 211 and the second stopped vehicle 212 and that is spaced a predetermined distance from the right end 211a of the first stopped vehicle 211. A distance between the first stopped vehicle 211 and the first candidate position 217 is shorter than a distance between the second stopped vehicle 212 and the first candidate position 217. That is, the first candidate position 217 is closer to the first stopped vehicle 211 than to the second stopped vehicle 212. The first candidate position 217 is a position that is adjacent to the first stopped vehicle 211, and that is side by side with (in substantially parallel with) the first stopped vehicle 211. The first candidate position 217 may be placed at an angle with respect to the first stopped vehicle 211.

The candidate position setting unit 144, for example, sets the second candidate position 218 to a position that is located between the first stopped vehicle 211 and the second stopped vehicle 212 and that is spaced a predetermined distance from the left end 212a of the second stopped vehicle 212. A distance between the first stopped vehicle 211 and the second candidate position 218 is longer than a distance between the second stopped vehicle 212 and the second candidate position 218. That is, the second candidate position 218 is closer to the second stopped vehicle 212 than to the first stopped vehicle 211. The second candidate position 218 is a position that is adjacent to the second stopped vehicle 212, and that is side by side with (in substantially parallel with) the second stopped vehicle 212. The second candidate position 218 may be placed at an angle with respect to the second stopped vehicle 212.

Subsequently, the target position determination unit 145 determines whether the first candidate position 217 is usable (S214). For example, the obstacle detection unit 142 may detect an obstacle, such as a curb and a traffic cone, at the first candidate position 217 on the basis of detected results of the distance measuring units 16, which are acquired by the data acquisition unit 141. In this case, the target position determination unit 145 determines that the first candidate position 217 is not usable (No in S214).

When it is determined that the first candidate position 217 is not usable, the target position determination unit 145 determines the second candidate position 218 as the moving target position (S215). When the obstacle detection unit 142 also detects an obstacle at the second candidate position 218, the target position determination unit 145 may determine that it is not possible to execute the double parking assist function.

On the other hand, when it is determined that the first candidate position 217 is usable (Yes in S214), the target position determination unit 145 determines the first candidate position 217 as the moving target position (S216). In this way, the target position determination unit 145 automatically determines (selects) one of the first candidate position 217 and the second candidate position 218 as the moving target position. The target position determination unit 145 may select one of the first candidate position 217 and the second candidate position 218 as the moving target position in accordance with the input of a driver's operation.

In the second example shown in FIG. 14, a partition line 220 defines a plurality of parking spaces 221. The first stopped vehicle 211 and the second stopped vehicle 212 are respectively stopped in the parking spaces 221 defined by the partition line 220. Two parking spaces 221 are provided between the first stopped vehicle 211 and the second stopped vehicle 212.

If the target position determination unit 145 sets the moving target position 215 to the center portion between the first stopped vehicle 211 and the second stopped vehicle 212, the moving target position 215 is provided in the two parking spaces 221 (i.e., the moving target position 215 is provided across the partition line between the two parking spaces 221). The target position determination unit 145 avoids setting such a moving target position 215.

The first candidate position 217 and the second candidate position 218 that are set by the candidate position setting unit 144 are each provided in one parking space 221. The target position determination unit 145 determines (i.e., sets, selects) one of the first candidate position 217 and the second candidate position 218 as the moving target position. When the vehicle 1 is stopped at the moving target position, the vehicle 1 is located in one of the parking spaces 221, and the other parking space 221 is vacant. In this way, the candidate position setting unit 144 and the target position determination unit 145 are able to determine a moving target position such that the parking spaces 221 are efficiently usable. A part of the moving target position may be located outside one parking space 221.

As described above, when the distance D2 between the first stopped vehicle 211 and the second stopped vehicle 212 is shorter than or equal to the second threshold, the target position determination unit 145 determines the moving target position 215 at the center portion between the first stopped vehicle 211 and the second stopped vehicle 212. On the other hand, when the distance D2 is longer than the second threshold, the target position determination unit 145 determines (i.e., sets, selects) one of the first candidate position 217 and the second candidate position 218 as the moving target position. In this way, the target position determination unit 145 automatically sets the moving target position of the vehicle 1 to a position commensurate with the distance D2.

The output information control unit 146 may control the display device 12 such that at least one of the symbols corresponding to the vehicle 1, the first stopped vehicle 211 and the second stopped vehicle 212 is displayed in accordance with the distance D2 between the first stopped vehicle 211 and the second stopped vehicle 212. Thus, the driver is allowed to recognize whether the moving target position is determined on the basis of the first stopped vehicle 211 or the second stopped vehicle 212.

In the above embodiment, there are provided the obstacle detection unit 142 that detects a stopped vehicle, and the target position determination unit 145 that sets the moving target position 206 or moving target position 207 of the vehicle 1 to a position that is located between the stopped vehicle 201 ahead and the stopped vehicle 202 behind, detected by the obstacle detection unit 142, and that is commensurate with (i.e., that is based on) the distance D1 between the stopped vehicle 201 ahead and the stopped vehicle 202 behind. With the above configuration, for example, the target position determination unit 145 is able to set a further appropriate target position in accordance with the distance D1 between the stopped vehicle 201 ahead and the stopped vehicle 202 behind.

In other words, the target position determination unit 145 sets the moving target position 206 or moving target position 207 of the vehicle 1 to a position that is located between the detected stopped vehicle 201 ahead and the detected stopped vehicle 202 behind and that is commensurate with the distance D1 between the stopped vehicle 201 ahead and the stopped vehicle 202 behind. In this way, because the target position determination unit 145 sets the further appropriate moving target position 206 or moving target position 207 in accordance with the distance between the stopped vehicles 201, 202, an increase in a burden on the driver and an increase in time required for parking are suppressed. The target position determination unit 145 sets the moving target position 215, moving target position 217 or moving target position 218 of the vehicle 1 to a position that is located between the detected first stopped vehicle 211 and the detected second stopped vehicle 212 and that is commensurate with the distance D2 between the first stopped vehicle 211 and the second stopped vehicle 212. With the above configuration, for example, the target position determination unit 145 is able to set a further appropriate target position in accordance with the distance D2 between the first stopped vehicle 211 and the second stopped vehicle 212. An increase in a burden on the driver and an increase in time required for parking are suppressed.

When the distance D1 between the stopped vehicle 201 ahead and the stopped vehicle 202 behind is longer than the first threshold, the target position determination unit 145 sets the moving target position 207 such that the distance between the moving target position 207 and the stopped vehicle 201 ahead is shorter than the distance between the moving target position 207 and the stopped vehicle 202 behind. Thus, for example, when there are two spaces in which the vehicle 1 is allowed to be parked between the stopped vehicle 201 ahead and the stopped vehicle 202 behind, the vehicle 1 is prevented from being stopped in the two spaces (the vehicle 1 is prevented from being parked across the two spaces). Also, when the distance D2 between the first stopped vehicle 211 and the second stopped vehicle 212 is longer than the second threshold, the target position determination unit 145 sets the moving target position (first candidate position 217) such that the distance between the moving target position (first candidate position 217) and the first stopped vehicle 211 is shorter than the distance between the moving target position (first candidate position 217) and the second stopped vehicle 212.

When the distance D2 between the first stopped vehicle 211 and the second stopped vehicle 212 is longer than the second threshold, the target position determination unit 145 sets the moving target position (first candidate position 217) that is side by side with the first stopped vehicle 211. Generally, the partition line 220 in a parking place is provided such that vehicles are parked side by side. Therefore, for example, when the first stopped vehicle 211 is stopped along the partition line 220, the target position determination unit 145 is able to set a further appropriate moving target position (first candidate position 217) without detecting the partition line 220. Even when the partition line 220 is not provided, the target position determination unit 145 is able to set a further appropriate moving target position. Also, when the distance D1 between the stopped vehicle 201 ahead and the stopped vehicle 202 behind is longer than the first threshold, the target position determination unit 145 sets the moving target position 207 that is in tandem with the stopped vehicle 201 ahead.

When the distance D2 between the first stopped vehicle 211 and the second stopped vehicle 212 is longer than the second threshold, the candidate position setting unit 144 sets the first candidate position 217 and the second candidate position 218. The first candidate position 217 is side by side with the first stopped vehicle 211 and closer to the first stopped vehicle 211 than to the second stopped vehicle 212. The second candidate position 218 is side by side with the second stopped vehicle 212 and closer to the second stopped vehicle 212 than to the first stopped vehicle 211. The target position determination unit 145 sets one of the first candidate position 217 and the second candidate position 218 as the moving target position (i.e., the target position determination unit 145 sets the moving target position to one of the first candidate position 217 and the second candidate position 218). For example, when there is an obstacle at the first candidate position 217, the target position determination unit 145 is able to set the second candidate position 218 as the moving target position. In this way, the target position determination unit 145 is able to set a further appropriate moving target position in accordance with a situation.

When the distance D1 between the stopped vehicle 201 ahead and the stopped vehicle 202 behind is longer than the first threshold and the distance between the vehicle 1 and the stopped vehicle 201 ahead is shorter than the distance between the vehicle 1 and the stopped vehicle 202 behind, the target position determination unit 145 sets the moving target position 207 such that the distance between the moving target position 207 and the stopped vehicle 201 ahead is shorter than the distance between the moving target position 207 and the stopped vehicle 202 behind. Therefore, a moving distance of the vehicle 1 to the moving target position 207 becomes shorter, so an increase in time required for parking is suppressed. Also, when the distance D2 between the first stopped vehicle 211 and the second stopped vehicle 212 is longer than the second threshold and the distance between the vehicle 1 and the first stopped vehicle 211 is shorter than the distance between the vehicle 1 and the second stopped vehicle 212, the target position determination unit 145 sets the moving target position (first candidate position 217) such that the distance between the moving target position (first candidate position 217) and the first stopped vehicle 211 is shorter than the distance between the moving target position (first candidate position 217) and the second stopped vehicle 212.

The output information control unit 146 controls the display device 12 such that at least one of the vehicle symbol 301 corresponding to the vehicle 1, the forward vehicle symbol 302 corresponding to the stopped vehicle 201 ahead and the rear vehicle symbol 303 corresponding to the stopped vehicle 202 behind is displayed in accordance with the distance D1 between the stopped vehicle 201 ahead and the stopped vehicle 202 behind. For example, when the target position determination unit 145 sets the moving target position 207 that is in tandem with the stopped vehicle 201 ahead, the output information control unit 146 controls the display device 12 such that only the vehicle symbol 301 and the forward vehicle symbol 302 are displayed on the command screen 300. Thus, even when the screen 12*a* of the display device 12 is small and the amount of displayable information is limited, the driver is allowed to recognize that the target position determination unit 145 sets the moving target position 207 on the basis of the stopped vehicle 201 ahead.

The above-described embodiment of the invention does not limit the scope of the invention, and is just one example that is included in the scope of the invention. For example, in an embodiment of the invention, modifications, omissions and/or additions may be made to at least part of specific application, structure, shape, operation and advantageous effect of the above-described embodiment of the invention without departing from the scope of the invention.

For example, in the above embodiment, the moving target position in the case where the vehicle 1 parallel parks or double parks is described; however, a moving target position for another method, such as front-end parking, may also be similarly determined.

What is claimed is:

1. A parking assist system comprising:
    an electronic control unit configured to detect a stopped vehicle, and to set a target position, to which a vehicle moves, to a position between a first stopped vehicle and a second stopped vehicle that are detected, the position being commensurate with a distance between the first stopped vehicle and the second stopped vehicle.

2. The parking assist system according to claim 1, wherein the electronic control unit is configured to, when the distance between the first stopped vehicle and the second stopped vehicle is longer than a threshold, set the target position such that a distance between the target position and the first stopped vehicle is shorter than a distance between the target position and the second stopped vehicle.

3. The parking assist system according to claim 2, wherein the electronic control unit is configured to, when the distance between the first stopped vehicle and the second stopped vehicle is longer than the threshold, set the target position that is in tandem with or side by side with the first stopped vehicle.

4. The parking assist system according to claim 1, wherein:
    the electronic control unit is configured to, when the distance between the first stopped vehicle and the second stopped vehicle is longer than a threshold, set a first candidate position and a second candidate position, the first candidate position is in tandem with or side by side with the first stopped vehicle and closer to the first stopped vehicle than to the second stopped vehicle, and the second candidate position is in tandem with or side by side with the second stopped vehicle and closer to the second stopped vehicle than to the first stopped vehicle; and
    the electronic control unit is configured to set one of the first candidate position and the second candidate position as the target position.

5. The parking assist system according to claim 1, wherein the electronic control unit is configured to, when the distance between the first stopped vehicle and the second stopped vehicle is longer than a threshold and a distance between the vehicle and the first stopped vehicle is shorter than a distance between the vehicle and the second stopped vehicle, set the target position such that a distance between the target position and the first stopped vehicle is shorter than a distance between the target position and the second stopped vehicle.

6. The parking assist system according to claim 1, further comprising:
    a display unit configured to be controlled by the electronic control unit so as to display at least one of a first image corresponding to the vehicle, a second image corresponding to the first stopped vehicle and a third image corresponding to the second stopped vehicle, in accordance with the distance between the first stopped vehicle and the second stopped vehicle.

7. The parking assist system according to claim 2, further comprising:

a display unit configured to be controlled by the electronic control unit so as to display at least one of a first image corresponding to the vehicle, a second image corresponding to the first stopped vehicle and a third image corresponding to the second stopped vehicle, in accordance with the distance between the first stopped vehicle and the second stopped vehicle.

8. The parking assist system according to claim 3, further comprising:
a display unit configured to be controlled by the electronic control unit so as to display at least one of a first image corresponding to the vehicle, a second image corresponding to the first stopped vehicle and a third image corresponding to the second stopped vehicle, in accordance with the distance between the first stopped vehicle and the second stopped vehicle.

9. The parking assist system according to claim 4, further comprising:
a display unit configured to be controlled by the electronic control unit so as to display at least one of a first image corresponding to the vehicle, a second image corresponding to the first stopped vehicle and a third image corresponding to the second stopped vehicle, in accordance with the distance between the first stopped vehicle and the second stopped vehicle.

10. The parking assist system according to claim 5, further comprising:
a display unit configured to be controlled by the electronic control unit so as to display at least one of a first image corresponding to the vehicle, a second image corresponding to the first stopped vehicle and a third image corresponding to the second stopped vehicle, in accordance with the distance between the first stopped vehicle and the second stopped vehicle.

11. The parking assist system according to claim 6, wherein the electronic control unit is configured to control the display unit to, when the distance between the first stopped vehicle and the second stopped vehicle is longer than a threshold, display the first image and the second image, and when the distance between the first stopped vehicle and the second stopped vehicle is shorter than or equal to the threshold, display the first image, the second image and the third image.

12. The parking assist system according to claim 7, wherein the electronic control unit is configured to control the display unit to, when the distance between the first stopped vehicle and the second stopped vehicle is longer than a threshold, display the first image and the second image, and when the distance between the first stopped vehicle and the second stopped vehicle is shorter than or equal to the threshold, display the first image, the second image and the third image.

13. The parking assist system according to claim 8, wherein the electronic control unit is configured to control the display unit to, when the distance between the first stopped vehicle and the second stopped vehicle is longer than a threshold, display the first image and the second image, and when the distance between the first stopped vehicle and the second stopped vehicle is shorter than or equal to the threshold, display the first image, the second image and the third image.

14. The parking assist system according to claim 9, wherein the electronic control unit is configured to control the display unit to, when the distance between the first stopped vehicle and the second stopped vehicle is longer than a threshold, display the first image and the second image, and when the distance between the first stopped vehicle and the second stopped vehicle is shorter than or equal to the threshold, display the first image, the second image and the third image.

15. The parking assist system according to claim 10, wherein the electronic control unit is configured to control the display unit to, when the distance between the first stopped vehicle and the second stopped vehicle is longer than a threshold, display the first image and the second image, and when the distance between the first stopped vehicle and the second stopped vehicle is shorter than or equal to the threshold, display the first image, the second image and the third image.

* * * * *